Aug. 6, 1935.  L. D. MANNES ET AL  2,010,459
PHOTOGRAPHIC SENSITIVE ELEMENT
Filed July 30, 1932
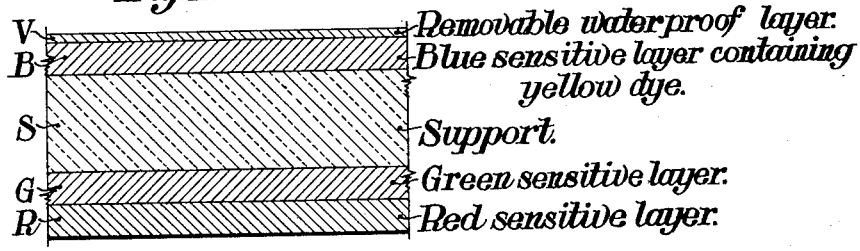
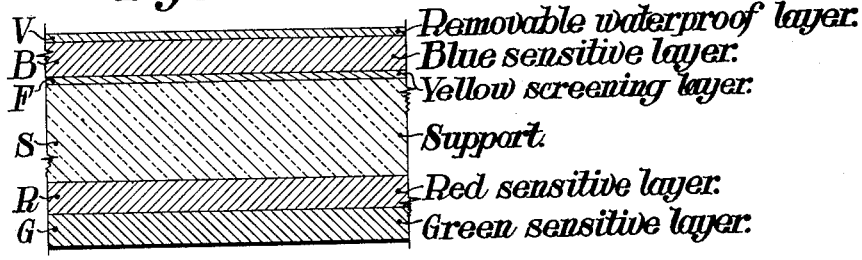
Leopold D. Mannes &
Leopold Godowsky, Jr.,
Inventors Patented Aug. 6, 1935

2,010,459

UNITED STATES PATENT OFFICE 2,010,459

PHOTOGRAPHIC SENSITIVE ELEMENT

Leopold D. Mannes and Leopold Godowsky, Jr.,
Rochester, N. Y.

Application July 30, 1932, Serial No. 626,733

5 Claims. (Cl. 95—2)

This invention relates to a photographic element and more particularly to a film having superposed layers of differential color sensitivity adapted for use in color photography. An object of the invention is to provide a film in which the several layers are capable of independent and easily performed photographic treatment, whereby various color component images may be formed in each of the several layers.

Reference will be made to the accompanying drawing, Fig. 1 of which shows on an enlarged scale a section of our improved film, and Fig. 2 shows similarly an alternative form.

This film comprises a support S of transparent material, such as glass or any well known plastic cellulosic composition having upon one surface a layer B which has only ordinary photographic sensitivity, that is, it is sensitive predominantly to blue light. It is a relatively transparent layer permitting the red and green light to pass freely. Over this layer is a varnish layer V which may be readily removed by stripping or by use of a suitable solvent and which is impervious to ordinary photographic baths. As an example of such a varnish is the following:

| | |
|---|---|
| Cellulose—benzyl ether | 150 g. |
| Benzene | 1550 cc. |
| Toluene | 100 cc. |
| Xylene | 400 cc. |

This coating may be easily removed with benzene. On the other side of the support are two layers G and R, which are respectively green and red sensitive. Since green and red sensitive layers are ordinarily also blue sensitive, there is incorporated either in the blue layer or upon the support under either the blue or green layers a filter layer absorbing blue light and transmitting the red and green light.

In the form shown in Fig. 1 the blue sensitive layer contains a yellow filter dye and the red sensitive layer is placed over the green sensitive layer. In the form shown in Fig. 2, the various layers are indicated by the same reference characters but the red layer is shown as between the green layer and the support and a separate screening or filter layer F is shown between the blue sensitive layer and the support. The emulsions in themselves are all types well known in the art.

The methods of use of the element herein described do not constitute the inventions herein claimed.

It may be stated, however, that the material may be used in a camera, in which case the exposure is made from the side of the film carrying the blue sensitive layer which faces the camera lens and the exposure is made through this layer upon the other two.

This material is also capable of use in processes involving two beams directed upon the opposite surfaces. In this case, light of a blue color only would be directed upon the blue sensitive side, while a beam containing the red and green light would fall on the other side.

In any event, the side of the film carrying the two emulsions would first be processed by any desirable method, such, for instance, as those described in our Patents 1,516,824, granted November 25, 1924 and 1,659,148, granted Feb. 14, 1928 and for such purposes would necessarily be a gelatino silver halide emulsion free from permanent dyes or dye formers adapted to constitute part of the final color image. Such processing would not affect the blue sensitive layer, since it is covered with the protective varnish layer V. After these two layers have been processed, the layer V would be removed and the layer B processed in any desirable manner, such as by color development in a developer giving a yellow image.

It is, of course, understood that the screening dye carried in the blue sensitive layer or in the filter layer F should be readily removable or discolored in the water or the ordinary photographic baths. A typical dye is tartrazine.

We have not specified particular methods of making the several layers since these as individual layers are known. Our invention resides in the particular combination which has special utility in practical processes.

The final composite is a three color subtractive image and is sufficiently transparent for projection purposes. The film may be used in a camera for original exposures or for the making of copies, either by direct copying from a similar film or by printing from separate color components.

We contemplate as included in the scope of our invention all modifications and equivalents covered by the following claims.

What we claim as new and desire to be secured by Letters Patent is:

1. An unexposed photographic film comprising a support, two superposed layers, color sensitive to two different regions of the visible spectrum, carried on one side of the support, and a third layer sensitive to a third region of the spectrum carried on the other side of the support and over said last named layer a thin, waterproof, readily removable protective layer.

2. An unexposed photographic film comprising a support, two permanently adherent, differentially sensitized superposed layers, each of said sensitive layers comprising a gelatino silver halide emulsion free from permanent image-forming dye compounds and color sensitive to two different regions of the visible spectrum, carried on one side of the support, and a third layer sensitive to a third region of the spectrum carried on the other side of the support and over said last named layer a thin, waterproof, readily removable protective layer.

3. An unexposed photographic film comprising a support, two permanently adherent, differentially sensitized superposed layers, each of said sensitive layers comprising a gelatino silver halide emulsion free from permanent image-forming dye compounds and color sensitive to two different regions of the visible spectrum, carried on one side of the support, and a third layer sensitive to a third region of the spectrum carried on the other side of the support and over said last named layer a thin, waterproof, readily removable protective layer, each layer being sufficiently transparent to permit light to pass through the entire film.

4. As an article of manufacture, an unexposed photographic film comprising a transparent support, two permanently adherent, superposed layers comprising silver halide emulsions, one sensitive to green but not to red light and the other sensitive to red but not to green light, carried on one side of the support and a third layer sensitive to blue but not to green or red carried on the other side of the support, a yellow filter associated with said last named layer and a thin, waterproof, readily removable protective layer over said blue sensitive layer.

5. As an article of manufacture, an unexposed photographic element comprising a transparent support, two permanently adherent, superposed, gelatino silver halide layers free from permanent dye-image forming compounds, one being sensitive to red but not to green and the other sensitive to green but not to red, carried on one side of the support, and a third layer sensitive to blue not to green or red carried on the other side of the support and a thin, waterproof, readily removable protective layer over said last named layer, there being also in the element in front of the green and red layers as viewed from the opposite side of the element a removable yellow filter dye.

LEOPOLD D. MANNES.
LEOPOLD GODOWSKY, Jr.